(12) United States Patent
Walczak

(10) Patent No.: US 8,219,765 B2
(45) Date of Patent: Jul. 10, 2012

(54) DATA NETWORK AND A METHOD OF REGENERATION OF THE RECORDING STATE OF DIGITAL DATA IN A DATA NETWORK

(75) Inventor: Jerzy Piotr Walczak, Sulejowek (PL)

(73) Assignee: ATM S.A., Warsaw (PL)

( * ) Notice: Subject to any disclaimer, the term of this patent is extended or adjusted under 35 U.S.C. 154(b) by 572 days.

(21) Appl. No.: 12/166,923

(22) Filed: Jul. 2, 2008

(65) Prior Publication Data

US 2009/0193205 A1   Jul. 30, 2009

(30) Foreign Application Priority Data

Jan. 26, 2008 (PL) .................................... 384327

(51) Int. Cl.
*G06F 13/00* (2006.01)

(52) U.S. Cl. .......... 711/161; 711/162; 714/20; 709/203; 709/217

(58) Field of Classification Search ............ 711/160, 711/162, 161; 709/203, 217; 714/719, 20
See application file for complete search history.

(56) References Cited

U.S. PATENT DOCUMENTS

| | | | |
|---|---|---|---|
| 5,632,012 A * | 5/1997 | Belsan et al. ............. 714/6.12 |
| 5,966,730 A * | 10/1999 | Zulch .......................... 711/162 |
| 7,246,269 B1 * | 7/2007 | Hamilton ...................... 714/42 |
| 7,275,130 B2 * | 9/2007 | Klein ........................... 711/105 |
| 2005/0073884 A1 * | 4/2005 | Gonzalez et al. ........ 365/185.02 |
| 2005/0131996 A1 * | 6/2005 | Mastrianni et al. .......... 709/203 |
| 2006/0212092 A1 * | 9/2006 | Pless et al. ...................... 607/45 |
| 2007/0260828 A1 * | 11/2007 | Swaminathan et al. ...... 711/154 |
| 2008/0091655 A1 * | 4/2008 | Gokhale et al. ................ 707/3 |
| 2009/0177932 A1 * | 7/2009 | Abts et al. .................... 714/704 |

\* cited by examiner

*Primary Examiner* — Hong Kim
(74) *Attorney, Agent, or Firm* — Seed IP Law Group PLLC

(57) ABSTRACT

A method of regeneration of a recording state of digital data stored in a node of a data network, the method including the steps of classifying files stored in the node, periodically writing a digital file from the node to a temporary memory, the temporary memory being a component of said node, and writing the digital file from the temporary memory to the same node.

12 Claims, 3 Drawing Sheets

DATA NETWORK AND A METHOD OF REGENERATION OF THE RECORDING STATE OF DIGITAL DATA IN A DATA NETWORK

BACKGROUND

1. Technical Field

The present disclosure relates to data networks in general and, in particular, to regeneration of the recording state of digital files stored in nodes of a data network.

2. Description of the Related Art

Media data, such as audio recordings and films, can nowadays be effectively archived in a digital format. Such media data is used for commercial, educational, and scientific purposes. In the case of large archives, the number of records (i.e., individual audio or video recordings) can be very large. Additionally, the size of digitized media files, especially video data converted to high quality digital format, is large (it may be in the order of terabytes, comprising a 1 hour long digital movie recording at resolutions of 2 k, 4 k, and higher), and in consequence archives of media files require large memory space. The digitized media can be stored on various carriers including, for example, CD, DVD, Blue Ray, HD DVD, hard disks, and others (e.g., magnetic tapes).

For large organizations (e.g., national archives, television and radio archives, museums, libraries of multimedia) using hard disks and, in general, purely electronic memories and memories designed as a combination of electronic devices and micro- or nanomechanical devices for storing media data is very useful as it does not require any manual or mechanical operations to be performed in order to access the stored files. As a result they can be accessed from remote locations (e.g., collocation or safety centers) via a telecommunications or data communications network.

The problem faced by some organizations is that the multimedia files should be archived for long or undefined time periods, for example if these are classified as a part of national heritage.

As mentioned above, files can be stored on various carriers or devices, which make it possible to record data. In the case of data networks, operating as repositories or digital media libraries with a constantly growing number of files, the most practical solution is using different types of purely electronic mass memories or electronic mass memories combined with micro- or nanomechanical devices.

The problem of any data storage medium is that it has a limited lifetime. With time the data stored on such a medium can be damaged or its readability may become worse due to natural aging processes of the carrier on which the data is written, or due to changes of values of the data recording state parameters related to physical contact of the carrier with the external environment.

BRIEF SUMMARY

The present disclosure obviates at least some of the above disadvantages and provides a method of regeneration of the recording state of digital data stored in the nodes of a data network.

Accordingly, the disclosure seeks to preferably mitigate, alleviate, or eliminate one or more of the disadvantages mentioned above singly or in any combination.

According to a first aspect of the present disclosure there is provided a method of regeneration of the recording state of digital data stored in a node of a data network, including the steps of classifying files stored in said node, periodically writing a digital file from said node to a temporary memory, wherein said temporary memory is a component of said node, and writing the digital file from the temporary memory to the same node.

Preferably, the steps of writing are performed if checking the digital file shows that said digital file is damaged. The method further comprises a step of repairing the digital file on said temporary memory.

According to another aspect of the present disclosure there is provided a data network comprising a plurality of nodes and at least one regeneration manager adapted to control the regeneration process of the recording state of digital files stored in said nodes. The regeneration manager is adapted to initiate the process of writing a digital file from a node to a temporary memory, the temporary memory being a component of this node, and then writing the digital file from the temporary memory to the same node. Said process of writing is carried out periodically.

According to a further aspect of the present disclosure there is provided a regeneration manager adapted to control the regeneration of the recording state of digital files stored in the nodes of a data network. Said regeneration manager is adapted to initiate the process of writing a digital file from a node to a temporary memory that is a component of said node, and then writing the digital file from the temporary memory to the same node, said process of writing carried out periodically.

The present disclosure provides the benefit of automated control and maintenance of quality of digital files stored for very long periods. The quality of files regenerated according to the method presented in the disclosure is maintained even after a very long period of storing, which makes it possible to employ this solution in perpetual archives. The quality is understood as preserving values of physical parameters of recording in predetermined acceptable limits.

In accordance with another embodiment of the present disclosure, a method of regenerating digital data stored in a computer-readable medium in a node of a data network is provided, the method including classifying the stored digital data in accordance with a date of expiry associated with the stored digital data; periodically writing the stored digital data from the computer-readable medium in the node to a temporary memory in the node, the stored digital data selected for periodic writing in accordance with the classifying of the stored digital data; and writing the digital data back to the computer-readable medium in the node to regenerate the stored digital data.

In accordance with another aspect of the foregoing embodiment, the method includes overwriting the same digital data in the computer-readable medium that is currently stored in the temporary memory. Ideally, the method includes first determining that a fully functional copy of the digital data will exist in the network prior to overwriting of the same in the computer-readable medium.

In accordance with another aspect of the foregoing embodiment, the method includes deleting from the computer-readable medium the digital data stored in the temporary memory. Ideally the method further includes first determining that a fully functional copy of the digital data to be deleted from the computer-readable medium exists in the network prior to deletion from the computer-readable medium.

In accordance with another embodiment of the present disclosure, a circuit is provided, the circuit including at least one regeneration manager adapted to control regeneration of digital data stored in a computer-readable medium in the circuit, the regeneration manager configured to classify the stored digital data in the computer-readable medium in accordance with a date of expiry associated with the stored digital data, periodically writing the stored digital data from the computer-readable medium in the circuit to a temporary memory in the circuit, the digital data selected for periodic writing in accordance with the classifying of the stored digital data; and writing the digital data from the temporary memory back to the computer-readable medium in the circuit to regenerate the digital data stored in the computer-readable medium.

In accordance with another aspect of the foregoing embodiment, the circuit includes the regeneration manager being adapted to initiate overwriting of the digital data in the computer-readable medium with the digital data stored in the temporary memory and verifying that at least one fully functional copy of the digital data will exist in the network prior to overwriting of the same in the computer-readable medium.

In accordance with another aspect of the foregoing embodiment, the circuit includes the regeneration manager being adapted to delete the digital data in the computer-readable medium that is currently stored in the temporary memory prior to writing of the digital data from the temporary memory back to the computer-readable medium, the regeneration manager further adapted to first determine that at least one fully functional copy of the digital data to be deleted from the computer-readable medium exists in the circuit prior to deletion of the same from the computer-readable medium.

BRIEF DESCRIPTION OF THE SEVERAL VIEWS OF THE DRAWINGS

The present disclosure will be understood and appreciated more fully from the following detailed description taken in conjunction with the drawings in which.

DETAILED DESCRIPTION

Figure 1:
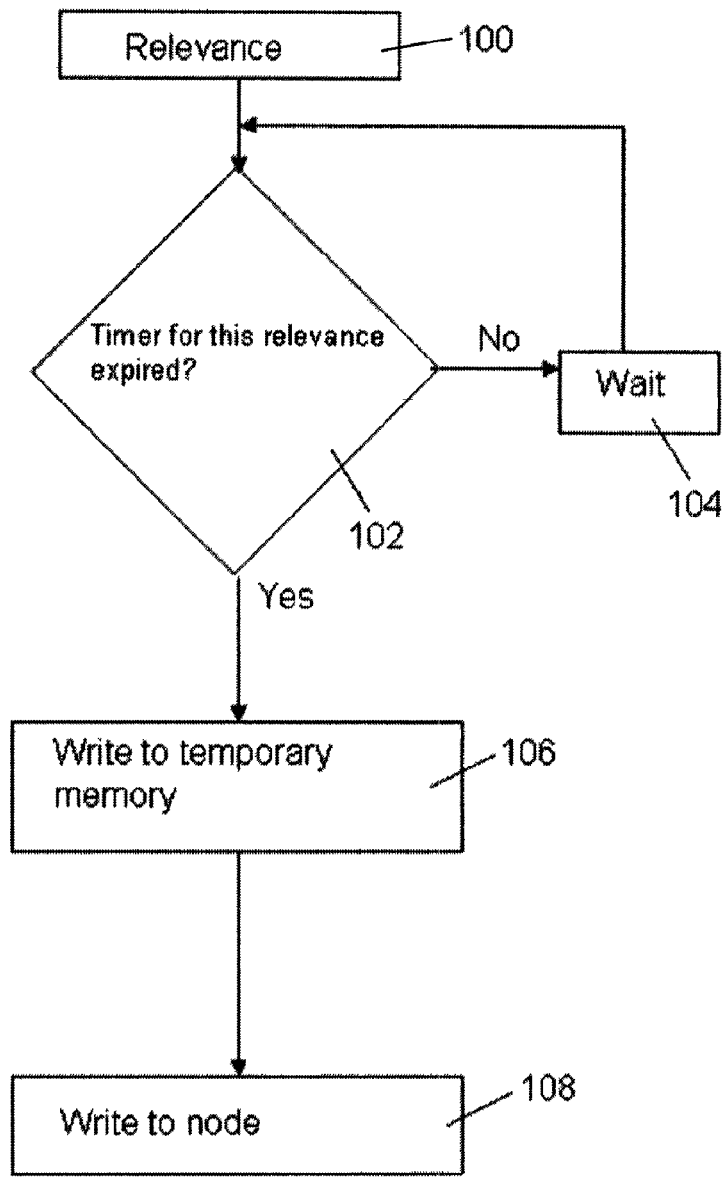
FIG. 1 is a diagram illustrating a method of regeneration of the recording state of digital data in one embodiment of the present disclosure.
Figure 3:
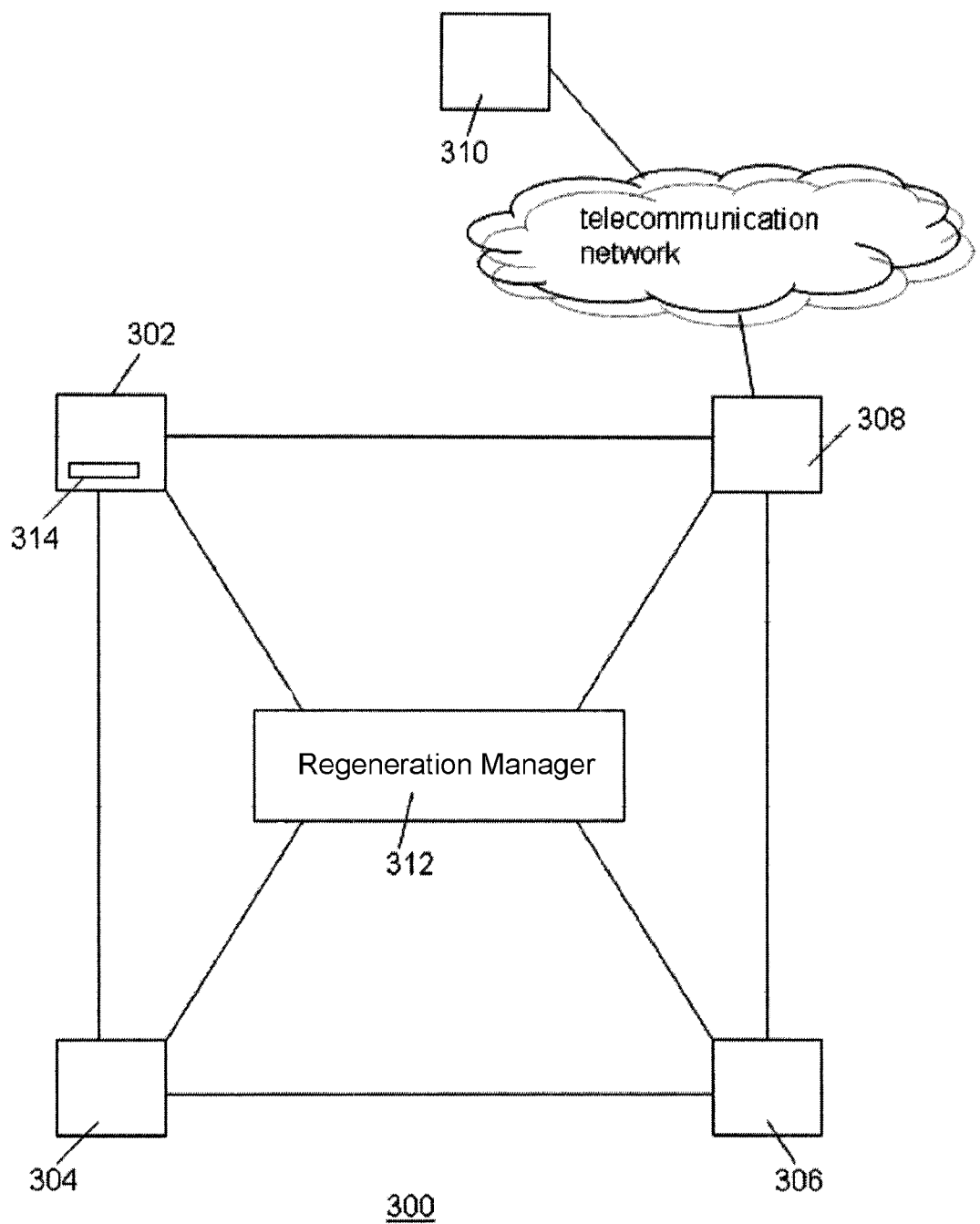
FIG. 3 is a diagram illustrating a network in one embodiment of the present disclosure.

With reference initially to FIGS. 1 and 3, a method of regeneration of the recording state of digital data in a data network according to one embodiment of the present disclosure is presented. The embodiments are illustrated using exemplary media files (e.g., audio, video or digital movies of 2 k, 4 k and higher resolutions) because the disclosure is particularly useful in data networks providing storage for organizations handling large archives of media files (e.g., TV networks, libraries, for example archives of TV or radio stations or archives collecting technical documentation). Some of these organizations are obliged to preserve such recordings and to maintain them for an undetermined period of time. However, the present disclosure is not limited to regeneration of media files exclusively but it may be successfully employed for regeneration of the recording state of any digital files.

In one embodiment the media files are stored in a node 302 (such as a server) of a data network 300 having a plurality of nodes 302, 304, 306, 308, and 310. In this embodiment, the digital files stored in the node 302 are classified 100 based on the expiry date of their recording state. A digital file from the node 302 is periodically 102, 104 written 106 to a temporary memory 314 (e.g., of a type of Random Access Memory (RAM)). The periodicity of this operation depends on the expiry date, the expiry dates and dates of regeneration being stored by the regeneration manager whereas copies of the information about the expiration and regeneration dates are also written in the node memory. In a final step the digital file is written back 108 from the temporary memory 314 to the node 302. The act of rewriting the data into the node 302 in essence regenerates the data to be stored so that it obtains a state of freshly stored data having a new expiration date.

The temporary memory is a component of the node 302 whereby the regeneration of the recording state is an internal node process.

In a simplest embodiment, all digital files in the given node are classified such that they have equal relevance and are regenerated in same cycle. In another embodiment another form of classification is used and also more than one category of files is used. In this situation the files belonging to a higher category are regenerated more frequently then the ones of a lower category. The process of regeneration of the values of the recording state is performed periodically and the periodicity depends on the next date of regeneration of the values of the recording parameters for a given node of a data network or the category of files. The expiry date of the regeneration is obtained empirically and depends on the physical parameters of the storage device, used for the design of the data network nodes. It is to be understood that scheduled regeneration dates are chronologically later than the expiration dates.

The file category is assigned when recording the file to the archive for the first time. The category may be changed in a free manner if the importance of the file will be changed in terms of its archival value. The regeneration process is performed during the predetermined period, reserved for performing this operation, and this time is shorter than the periods between the successive regeneration operations.

In a preferred embodiment, a regeneration manager 312 includes a timer for each relevance level and the steps of the method are carried out after expiring 102 the time for a particular recording state. If the timer has not expired, the regeneration manager 312 waits 104 until it is expired.

Figure 2:
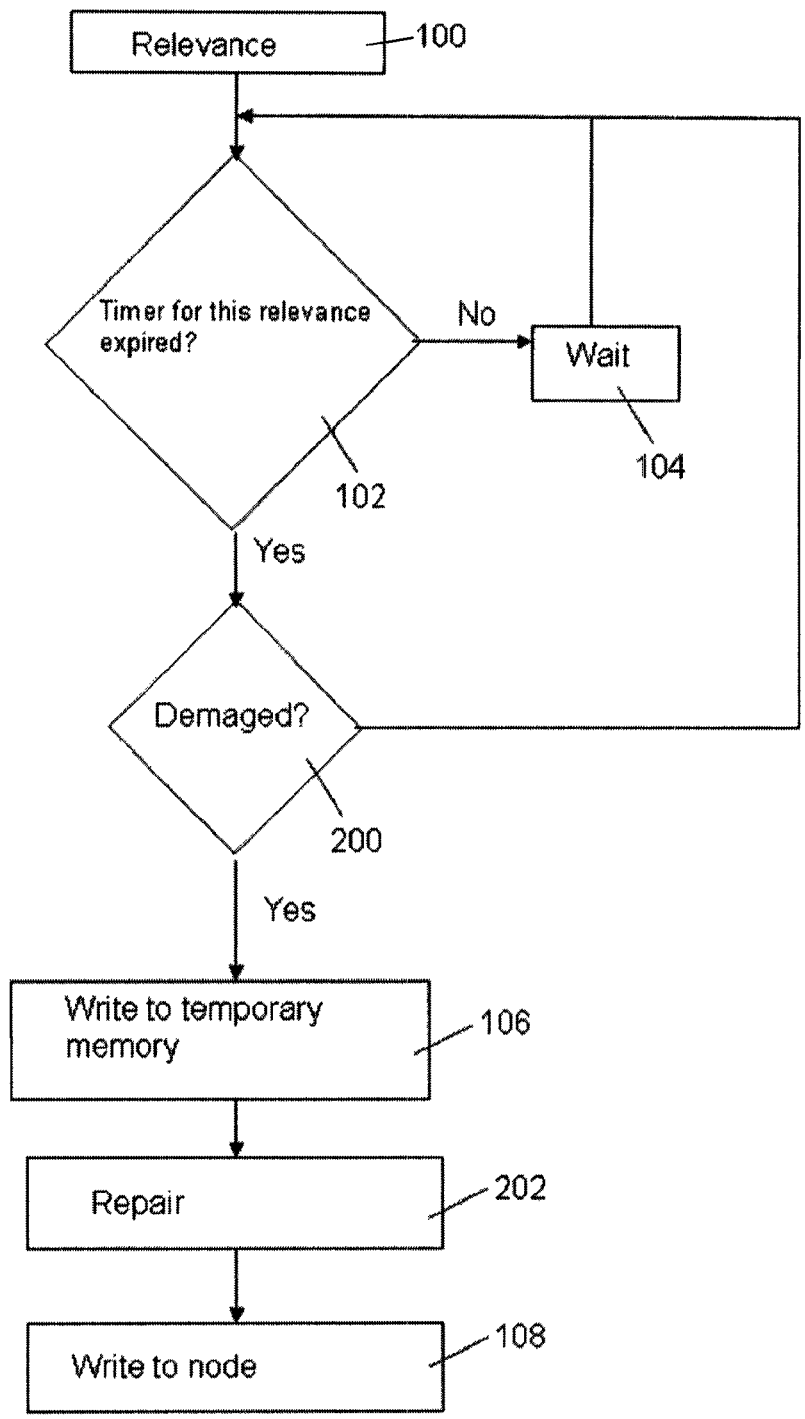
FIG. 2 is a diagram illustrating a method of regeneration of the recording state of digital data in an alternative embodiment of the present disclosure.

In a preferred embodiment illustrated in FIG. 2 the steps of writing to the temporary memory 106 and to the node 108 are performed if checking 200 the digital file shows that said digital file is damaged. If the file is damaged, the method further includes an algorithm of repairing 202 the digital file. One or more known methods of repairing digital files may be used. The repair 202 is carried out when the damaged data file is in the temporary memory.

In one embodiment the temporary memory is a shared memory or cache memory in the first file server 302.

In one embodiment by checking against errors in the files or other types of damage and carrying out the method of repairing only if such errors are detected, the method is optimized from the point of view of resource usage. It must be remembered that the media files are large, and in a large repository the amount of data to be regenerated is also large. Therefore limiting the method only to those files that suffered some level of damage greatly improves overall performance of the method.

In the above-mentioned embodiment, once the digital file is repaired 202, it is written 108 again to the node 302.

In one embodiment after writing 106 the digital file to the temporary memory 314 the digital file is deleted from the node 302. Alternatively, during writing 108 the digital file from the temporary memory 314 to the node 302, the digital file overwrites its earlier copy in the node 302.

Similarly, in another embodiment, after writing 108 the digital file to the node, the copy of the digital file is deleted from the temporary memory.

Preferably, in order to maintain a high level of security of the data stored in the data network 300, before deletion of a regenerated file the regeneration manager checks if at least one fully functional copy of the digital file will exist in the network after said deletion. The regeneration manager obtains information about other copies of said file from higher level objects in said network or it utilizes information about copies of data buffered temporarily in a local storage of the node.

With reference to FIG. 3 a data network 300 comprising plurality of nodes 302, 304, 306, 308, and 310 and at least one regeneration manager 312 is presented. The regeneration manager controls the regeneration of digital files stored in said nodes 302, 304, 306, 308, and 310 in accordance with one embodiment of the present disclosure.

The nodes 302, 304, 306, 308, and 310 are connected to the regeneration manager 312. In one embodiment the network is based on mesh topology; however, ring networks or other types of network topologies, or a combination of various network topologies is also possible. In some embodiments all the nodes are connected using Local Area Network (e.g., a corporate network based on the Ethernet technology). In an alternative embodiment, illustrated in FIG. 3, one of the nodes 310 is connected to the rest of the network via the Internet. These types of connections are known in the art and may include Virtual Private Networks. However, it is emphasized that any technology as well as any topology may be used.

The operation of the regeneration manager 312 is as described with reference to FIGS. 1 and 2 and below in another embodiment.

The regeneration manager 312 after checking dates in a calendar, activates the node 302 (or nodes 302, 304, and 306), in which the regeneration process is to be performed. The node 302 may carry out the regeneration only on its own, i.e., isolating the regeneration process from external influences.

Some portions of data from the mass storage of the node 302 (i.e., the recording which is being regenerated) are transferred to a buffer created from the temporary memory 314 of the node 302, and then they are checked and written back to the node storage and checked again after the writing process. In one embodiment certain space of the mass storage is isolated and is not used, its only purpose being the realization of the regeneration process or another maintenance task, e.g., during reformatting a file. A content of another storage space may be copied temporarily or permanently to this space of the node storage leaving said another storage free from protected record (so called TMP or TEMP—a similar principle is the basis of the swap file operation, for example in an operating system). The regeneration process is aimed at improving or restoring the appropriate (analog) values of the parameters of the used physical phenomena on which the data recording is based. Then, the node 302 acknowledges completion of the process (if no errors occurred) and the regeneration manager 312 orders to switch off the node. If the switching off action was planned, the node deactivates itself or performs other requested tasks. It should be emphasized that the regeneration procedure is obligatory from time to time, but the time at which it should be performed is predetermined and in some embodiments the time may be even a several years long period.

The below embodiments of regenerating physical parameters of the recording state are presented for different types of memories.

EXAMPLE I

The Discrimination of the Value of the Physical Parameter is Available and the Parameter Values are Measurable Consider a disk being almost identical to a hard disk (with recording onto a magnetic carrier). Suppose our information is written relatively prodigally by spreading it across two states of magnetization. The reading is realized such that the reading head converts the values of the magnetization state into the resistance value (more precisely, e.g., a change of the current or voltage). Assume the measured values are delivered to a several-windows discriminator. If the values of the states are too different and exceed the predetermined range of discrimination levels, then they are corrected, i.e., magnetized again, restoring the predetermined levels of the discrimination. Such process will be one of the types of regeneration, without using an external storage and performing the regeneration at the computer processing level. As it can be seen, such regeneration process is applicable, however it requires a relatively precise apparatus.

EXAMPLE II

The Discrimination of the Value of the Physical Parameter is Available and the Parameter Values are Measurable, However the Recording is Multiple-Valued This case is similar to that described in Example I. Assume, the information is written locally by giving the magnetization value of a microregion of a disk as an average magnetization (analog) in this region. A series of discrimination windows are ordered, creating a ladder, e.g., of 16 levels. Then, one can encode information in this location locally. If one detects, during the read out, that a state is located at a lower threshold of a given discrimination window, then the state is completed such that it is located at the upper threshold of the discrimination window. Obviously, the ranges of the measured parameter between the discrimination windows will be "safety belts".

EXAMPLE III

The Discrimination of the Value of the Physical Parameter is Available and the Parameter Values are Non-Measurable within the Discrimination Window This case is similar to Example I. However, the measurement electronics can not determine at which threshold of the window the value is located. In such case a temporary memory will be needed which will make it possible to store the read out of the averaged state temporarily within the discrimination window. In this case one assumes, based on tabulated empirical data or another selection rule, that the expiry date has passed, i.e., one may expect spontaneous writing errors (demagnetization of the layer, on which the recording is written). In this case there is no possibility of correcting the recording at the analog level, but one can perform 100% correction by transferring the information to a temporary memory and writing it again. Of course, storing in the temporary memory the state of a single bit would not be very efficient, therefore this solution will be more efficient if it will be performed for a certain collection of data written in a larger region. This procedure will also make it possible to correct possible errors by computer processing, employing correction methods with redundancy. Of course, this method also includes transferring a large data file to the temporary memory and its re-writing, which depends only on the size of the temporary storage.

EXAMPLE IV

If there is no possibility to produce or modify a temporary memory, yet one still wants to use a ready solution, for example a hard disk of arbitrary internal design, then the regeneration process may be performed with the use of a vast temporary storage. Such solution is based on copying the whole contents written on the disk to the temporary storage, and then performing the procedure of removing the state remained after previous formatting and writing procedures, for example by writing all the sectors with a predetermined byte pattern, and then, performing operations relating to restoring the disk to the state after logical formatting and rewriting the contents from the temporary device to the disk. Current designs of hard disks are more complicated in terms of internal structure, and one can not create the regeneration procedure employing, e.g., Int 13H.

EXAMPLE V

Memory Purely Electronic without Mechanical Elements

In such a case one can employ EEPROM memory (or rather its modified version FlashProm), which generally keeps the state of recording for a few years. The disadvantage of this memory is that it may be written a finite number of times, however, in this case this restriction is weak because it will be at least tens of thousands of times, this meaning even if a recording would be regenerated once a year, the life time of this memory would be tens of thousands of years. Surely, during such a period other types of non-volatile memories (Read/Write) will be developed. Of course, for repositories based on data networks using such memories would be almost an ideal solution at the current level of technology. In the case of regeneration of the recording state in memories of purely electronic type (e.g., static and dynamic), the regeneration operation may be carried out practically with the resolution of a single bit, whereby the temporary memory is reduced to minimum (i.e., it is so called a latch-up). There are, however, some limitations for certain types of the EEPROM memories. In practice, the regeneration in these cases requires employing a temporary electronic memory, since written memory blocks can not be overwritten. The writing operation is performed in free regions. A free region (ready for writing) is obtained by deleting the block and sometimes the whole memory (depending on the controller). Only after this step is the memory ready for writing.

Also, it should be emphasized that in the case of using currently available technologies of mass memories, the combination of micromechanics and electronic circuits is always connected with a motion, i.e., the read out (and the writing as well) and is dynamic from a user's and controllers' points of view (some element has to move). In the case of purely electronic memories there are no moving macroscopic size elements, this also being an important advantage of this type of devices.

Referring to the memories based on storing a charge in latch-ups, in the case of dynamic memories the regeneration of the recording state is built-in into the operation of these memories. The regeneration process is performed in periods of about ten or fifteen thousandths of second, although it may be performed a very large number of times (infinite in theory) without damaging the memory itself (this on the other hand being limited in EEPROMs). Unfortunately, this type of memories is not suitable for creating repositories based on data networks, because the memory is of very short duration (the memory is usually called a volatile one), i.e., it is not suitable for creating mass memories.

The node 302 is not only a file server (in a typical meaning) but it also performs a lot of other functions a typical file server does not do. For example it regenerates the recording state, and it may be the regeneration manager. Also, the node memory may be divided into the operational memory (RAM type) and the mass memory. The latter may be divided into areas written, ready to be written and left for maintenance purposes, including, e.g., the regeneration processes. If one switches off a node of the network, the node still belongs to the network, although it is inactive. Such node, independently on its state (active, inactive or damaged) is an isolated object and a change of its activity is controlled from outside.

As will be readily appreciated from the foregoing, the network and method of the present disclosure provides an efficient regeneration of digital data stored on various carriers, including, without limitation, magnetic tapes, CDs, DVDs, Blu-ray, HD DVDs, hard disks, and other well-known computer-readable media for storing digital data. The classification of the digital data can be done utilizing an existing processor, microprocessor, or other well-known computing means in accordance with established parameters for data stored in their respective medium. For example, a processor is configured with information regarding the length of time data can be safely stored on an associated computer-readable medium. Based on this information, the processor classifies the data stored thereon according to dates of expiration. The data can be organized into files and classified, for example, based on the date the data was initially stored on the computer-readable medium. Dates for regenerating the data are then scheduled based on the expiration dates, e.g., the regeneration date would be scheduled after the expiration date but before a date on which data can become corrupted. Alternatively, the expiration date can be the last possible date before data is corrupted, in which the regeneration date would be scheduled before the data of expiration. In the preferred embodiment disclosed herein, the date of expiration can correspond to the regeneration date, the two dates being one and the same.

Data so rewritten from the temporary memory into the computer-readable medium in the node is thus refreshed or regenerated to have a new date of expiration, which is recalculated by the processor. The process then repeats itself periodically to maintain the data in uncorrupted form.

The various embodiments described above can be combined to provide further embodiments. Aspects of the embodiments can be modified, if necessary, to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method of regeneration of the recording state of digital data stored in a node of a data network, comprising the steps of:

a) classifying digital data files stored in mass memories of the node to perform a regeneration process,
b) activating the node through a regeneration manager to perform the regeneration process;
c) periodically writing a digital file from the node to a temporary memory located in the node, the periodicity of writing the digital file to the temporary memory depending on an expiry date, which in turn depends on physical parameters of a mass memory used in the node, wherein the temporary memory is a component of the node, and the regeneration of the recording state is an internal node process that restores values of physical parameters of used physical phenomena on which the data recording in the mass memory of the node located in the data network is based;
d) writing the digital file from the temporary memory back to the mass memory of the same node; and
e) acknowledging by the node the completion of the regeneration process if no errors occurred within the regeneration process.

2. The method of claim 1 wherein the classifying digital files is performed based on the expiry date of the recording state.

3. The method of claim 1 wherein the writing is performed if checking the digital file shows that the digital file is damaged.

4. The method of claim 1 wherein after writing the digital file to the temporary memory the digital file is deleted from the mass memory located in the node.

5. The method of claim 4 wherein, before a deletion operation of a regenerated data file, checking a fully functional copy of the digital file will exist in the node after the deletion.

6. The method of claim 1 wherein during writing the digital file from the temporary memory to the mass memory of the node the digital file overwrites its earlier copy in the mass memory located in the node.

7. The method of claim 1 wherein the expiry dates are stored by a regeneration manager, and a copy of the expiry dates are also written in the mass memory of the node.

8. The method of claim 1 wherein regeneration dates are stored by a regeneration manager, and a copy of the regeneration dates is also written in the mass memory of the node.

9. The method of claim 1 wherein after writing the digital file from the temporary memory back to the mass memory of the same node, a new expiry date is obtained.

10. A circuit, comprising:
at least one regeneration manager adapted to control regeneration of digital data stored in a mass memory in the circuit, the regeneration manager configured to carry out the following:
a) classifying digital data files stored in mass memories of the node to perform a regeneration process,
b) activating the node through a regeneration manager to perform the regeneration process;
c) periodically writing a digital file from the node to a temporary memory located in the node, the periodicity of writing the digital file to the temporary memory depending on a expiry date, which in turn depends on physical parameters of a mass memory used in the node, wherein the temporary memory is a component of the node, and the regeneration of the recording state is an internal node process that restores values of physical parameters of used physical phenomena on which the data recording in the mass memory of the node located in the data network is based;
d) writing the digital file from the temporary memory back to the mass memory of the same node; and
e) acknowledging by the node the completion of the regeneration process if no errors occurred within the regeneration process.

11. The circuit of claim 10 wherein the regeneration manager is adapted to initiate overwriting of the digital data in the mass memory with the digital data stored in the temporary memory and to verify that a fully functional copy of the digital data will exist in the node prior to overwriting of the same in the mass memory.

12. The circuit of claim 10 wherein the regeneration manager is adapted to delete the digital data in the mass memory that is currently stored in the temporary memory prior to writing of the digital data from the temporary memory back to the mass memory, the regeneration manager further adapted to first determine that at least one fully functional copy of the digital data to be deleted from the mass memory exists in the circuit prior to deletion of the same from the mass memory.

* * * * *